(12) United States Patent
Zhang et al.

(10) Patent No.: US 11,301,471 B2
(45) Date of Patent: Apr. 12, 2022

(54) DATABASE JOIN PREFETCHER

(71) Applicant: International Business Machines Corporation, Armonk, NY (US)

(72) Inventors: Hong Mei Zhang, Beijing (CN); Xiaobo Wang, Beijing (CN); Shuo Li, Beijing (CN); Sheng Yan Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 16/879,879

(22) Filed: May 21, 2020

(65) Prior Publication Data

US 2021/0365455 A1    Nov. 25, 2021

(51) Int. Cl.
*G06F 16/24* (2019.01)
*G06F 16/2453* (2019.01)
*G06F 16/242* (2019.01)
*G06F 16/2455* (2019.01)

(52) U.S. Cl.
CPC .... *G06F 16/24544* (2019.01); *G06F 16/2425* (2019.01); *G06F 16/2456* (2019.01)

(58) Field of Classification Search
None
See application file for complete search history.

(56) References Cited

U.S. PATENT DOCUMENTS

| | | | | |
|---|---|---|---|---|
| 5,241,648 | A * | 8/1993 | Cheng | G06F 16/2456 |
| 5,822,749 | A * | 10/1998 | Agarwal | G06F 16/2228 |
| 10,664,474 | B1 * | 5/2020 | Chunduru | G06F 16/24544 |
| 2012/0317094 | A1 * | 12/2012 | Bear | G06F 16/24542 707/714 |
| 2015/0339350 | A1 * | 11/2015 | Baggett | G06F 16/2456 707/714 |
| 2016/0103879 | A1 | 4/2016 | Attaluri et al. | |
| 2018/0046674 | A1 | 2/2018 | Grochowski et al. | |
| 2019/0197162 | A1 | 6/2019 | Chiang | |
| 2019/0370268 | A1 | 12/2019 | Koochakzadeh et al. | |

* cited by examiner

*Primary Examiner* — Son T Hoang
(74) *Attorney, Agent, or Firm* — William H. Hartwell

(57) ABSTRACT

A database query processor includes a database join prefetcher that prefetches N next join column values in order to execute the query more efficiently. The prefetched next join column values for an inner table are used to skip rows in an outer table, thereby increasing the performance of executing the query. The number N of prefetches can be dynamically determined and adjusted to improve the performance of executing the query.

18 Claims, 10 Drawing Sheets

SELECT A.C1, A.C2, A.C3, B.C4, C.C5
FROM A, B, C
WHERE A.C1 = B.C1 and A.C2= C.C2

IX1 ON A(C1,C2)   Total rows 5000 KEYCARDF(C1,C2) 5000
IX2 ON B(C1)     Total rows 10000 KEYCARDF(C1) 100
IX3 ON C(C2)     Total rows 10000 KEYCARDF(C2) 100

Initial Setting for N = Max(1,CARDF(Join_Col_Inner)/CARDF(Join_Col_Outer)+1)

DATABASE JOIN PREFETCHER

BACKGROUND

1. Technical Field

This disclosure generally relates to database systems, and more specifically relates to table joins in a database system.

2. Background Art

Databases are computerized information storage and retrieval systems. A database system is structured to accept commands to store, retrieve and delete data using, for example, high-level query languages such as the Structured Query Language (SQL). The term "query" denotes a command for retrieving data from a stored database. The query language requires the return of a particular result set in response to a particular query.

Performing joins of multiple tables is one particular type of database query that can take significant time. A join operation is used to combine rows from two or more tables in the database based on a common column between them. Common techniques for performing a join operation includes the merge-sort, nested-loop, and hash join. A query optimizer builds a query plan to determine the join method and join order basing on the statistics of the data. A query processor then executes the query will execute and fetches the rows from each table based on the query plan.

Known techniques for joining tables do not recognize or consider the effect of data skew in join columns in different tables. Data skew on join columns in different tables occur when distinct values of the join column in the outer table do not match the distinct values of join columns in the inner table. This means that most of the rows fetched from the outer table will be filtered out after accessing the inner table. Processing a large number of outer table rows that are finally filtered out requires processing time that reduces the performance of the query.

BRIEF SUMMARY

A database query processor includes a database join prefetcher that prefetches N next join column values in order to execute the query more efficiently. The prefetched next join column values for an inner table are used to skip rows in an outer table, thereby increasing the performance of executing the query. The number N of prefetches can be dynamically determined and adjusted to improve the performance of executing the query.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

A database query processor includes a database join prefetcher that prefetches N next join column values in order to execute the query more efficiently. The prefetched next join column values for an inner table are used to skip rows in an outer table, thereby increasing the performance of executing the query. The number N of prefetches can be dynamically determined and adjusted to improve the performance of executing the query.

Figure 1:
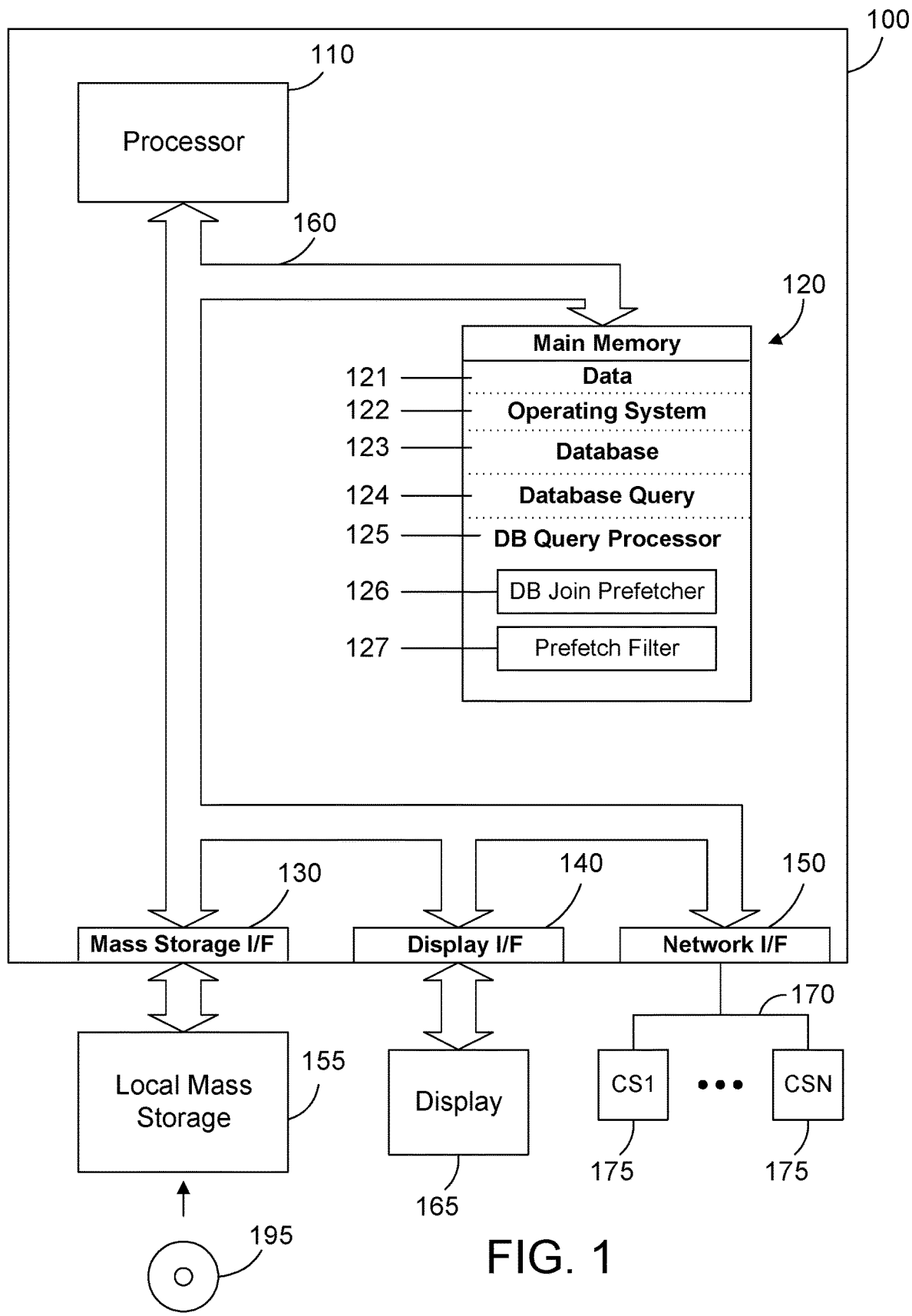
FIG. 1 is a block diagram of a computer system that includes database query processor that includes a database join prefetcher.

Referring to FIG. 1, a computer system 100 is one suitable implementation of a computer system that includes a database query processor that includes a database join prefetcher as described in more detail below. Computer system 100 is an IBM POWER9 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195. Another suitable type of local mass storage device 155 is a card reader that receives a removable memory card, such as an SD card, and performs reads and writes to the removable memory. Yet another suitable type of local mass storage device 155 is universal serial bus (USB) that reads a storage device such as a flash drive.

Main memory 120 preferably contains data 121, an operating system 122, a database 123, a database query 124, and a database query processor 125. Data 121 represents any data that serves as input to or output from any program in computer system 100. Operating system 122 is a multitasking operating system, such as AIX or LINUX. Database 123 represents any suitable database system, whether currently known or developed in the future. Database query 124 represents one or more database queries to the database 123. Database query 124 can include table joins as discussed in more detail below. The database query processor 125 processes database queries, such as database query 124, to access data in the database 123. The database query processor 125 includes a database join prefetcher 126 that prefetches join column values from inner tables during a table join, and also includes a prefetch filter 127 that filters (i.e., skips) rows in an outer table based on prefetched join column values from one or more inner tables, as described in more detail in the examples below.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, database 123, database query 124, and database query processor 125 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the database query processor 125.

Although computer system 100 is shown to contain only a single processor and a single system bus, those skilled in the art will appreciate that a database query processor as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using one or more I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Computer systems 175, shown as CS1, . . . , CSN in FIG. 1, represent computer systems that are connected to the computer system 100 via the network interface 150 in a computer cluster. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter. Of course, network interface 150 can also represent multiple network interfaces.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figures 2, 3:
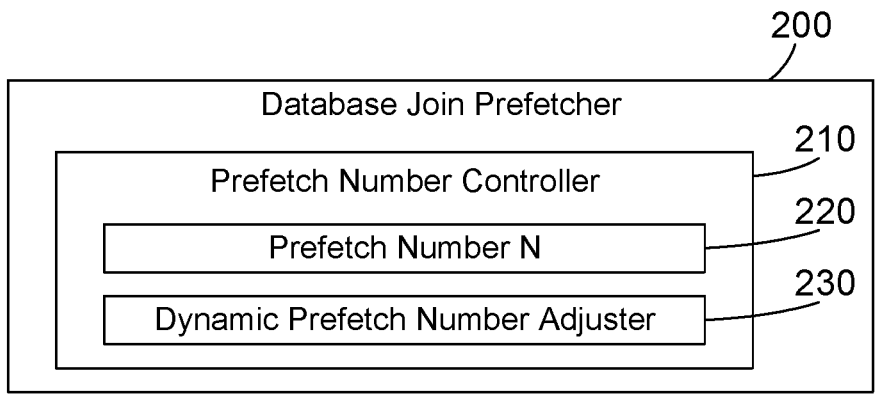
FIG. 2 is a block diagram showing a suitable implementation for the database join prefetcher.
FIG. 3 is a sample database query with associated indices.

Referring to FIG. 2, database join prefetcher 200 is one specific implementation for the database join prefetcher 126 in FIG. 1 in accordance with a preferred embodiment. The database join prefetcher 200 includes a prefetch number controller 210 that determines a prefetch number N 220 that determines a number of prefetches of join column values for an inner table during execution of a database query. In one suitable implementation, there is a single prefetch number N as shown in FIG. 2 that applies to all inner tables. In another suitable implementation, each inner table can have its own prefetch number N. Prefetch number controller 210 also includes a dynamic prefetch number adjusted 230 that can dynamically adjust the prefetch number N to improve performance of a join query.

FIG. 3 shows a sample database query, the execution of which will perform joins of tables A, B and C. IX1 is an index on table A with the attributes shown in FIG. 3. IX2 is an index on table B with the attributes shown in FIG. 3. IX3 is an index on table C with the attributes shown in FIG. 3.

Figure 4:
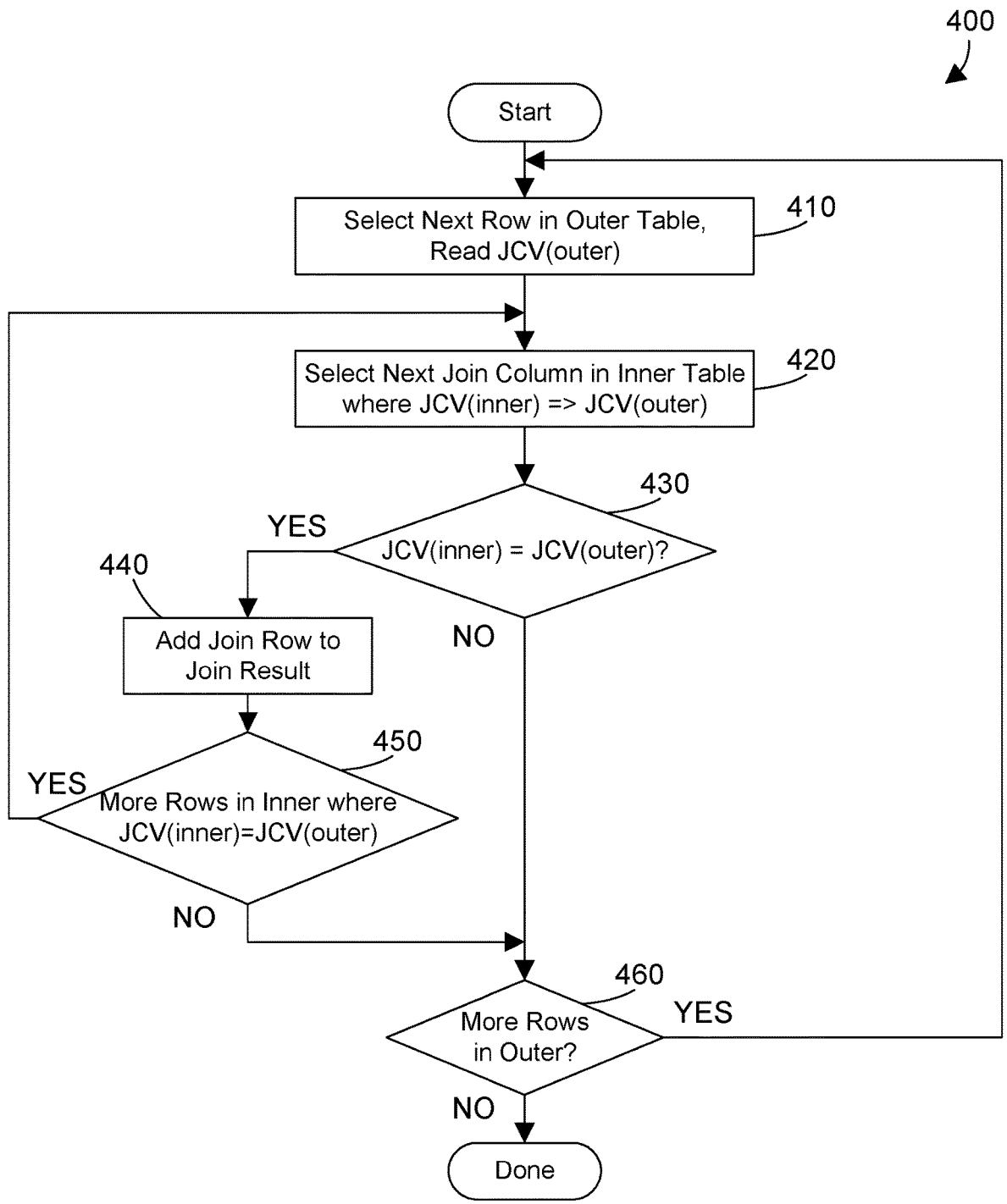
FIG. 4 is a flow diagram of a prior art method for performing a join of two tables.

FIG. 4 shows a prior art method 400 for processing a join of two tables. When there are multiple table joins in processing a query, method 400 would be repeated for each table join. The next row in an outer table is selected (step 410). The next join column in the inner table is selected where the join column value of the inner table JCV(inner) is greater than or equal to the join column value of the outer table JCV(outer) (step 420). When JCV(inner) equals JCV (outer) (step 430=YES), the join row is added to the join result (step 440). When there are more rows in the inner table where JCV(inner)=JCV(outer) (step 450=YES), method 400 loops back to step 420 and continues. When there are no more rows in the inner table where JCV(inner)=JCV(outer) (step 450=NO), and when there are more rows in the outer table (step 460=YES), method 400 loops back to step 410 and continues. When JCV(inner) is not equal to JCV(outer) (step 430=NO), when there are more rows in the outer table (step 460=YES), method 400 loops back to step 410 and continues. When there are no more rows in the outer table (step 460=NO), method 400 is done.

Figure 5:
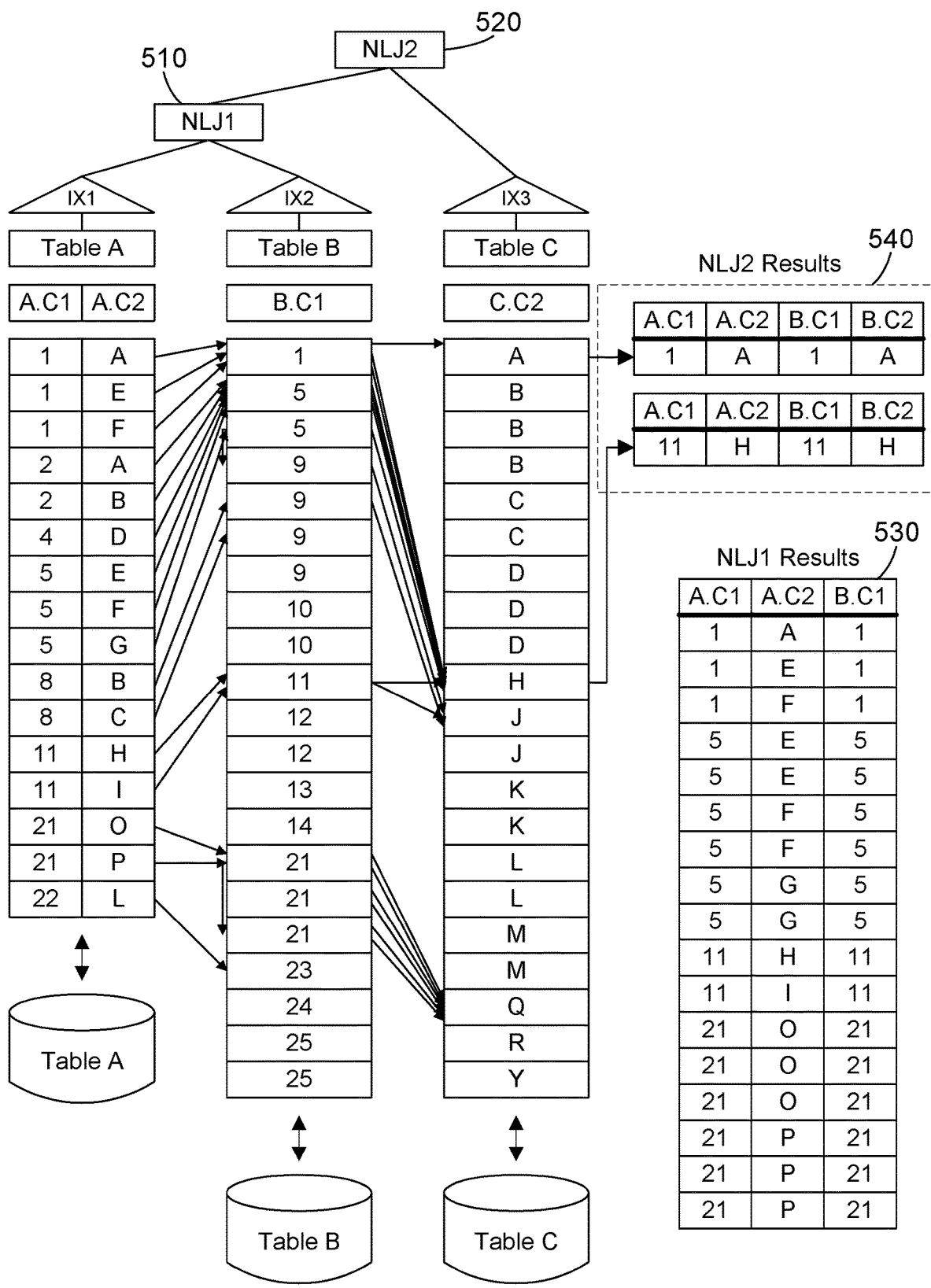
FIG. 5 is a block diagram illustrating one suitable example of joining three database tables in the sample query in FIG. 3 using the method in FIG. 4.

The execution of the query in FIG. 3 is now illustrated using the prior art method 400 in FIG. 4 for the sample database tables shown in FIG. 5. We assume for this example a query optimizer has generated a query plan that includes a first nested loop join NLJ1 510 that joins Table A and Table B, following by a second nested loop join NLJ2 520 that joins the results of NLJ1 with Table C. NLJ1 510 is processed first. The first row in Table A is selected, and the join column value JCV of 1 is read (step 410). The next join column value in Table B is selected where the JCV of the inner is greater than or equal to the JCV of the outer (step 420). The first row in B.C1 is selected and its value of 1 is read in step 420. The two JCV values are the same (step 430=YES), so the join row is added to the join result (step 440). This is shown in the first entry of the NLJ1 Results table 530 that has values 1, A, 1. There are no more rows in the inner table that have the same value 1 as the outer join column value (step 450=NO), and there are more rows in the outer table (step 460=YES), so method 400 loops back to step 410 and selects the next (second) row in the outer table, and reads its join column value of 1. The next join column in the inner table where JCV(inner) is greater than or equal to JCV(outer) is selected, which means the first row in B.C1 is selected, and the value of 1 is read. The two join column values are the same (step 430=YES), so the join row is added to the join result (step 440), resulting in the second entry of the NLJ Results table 530 that has values 1, E, 1. There are no more rows in the inner table that have the same value of 1 (step 450=NO), and there are more rows in the outer table (step 460=NO), so method 400 loops back to step 410 and selects the next (third) row in the outer table, and reads its join column value of 1. The next join column in the inner table where JCV(inner) is greater than or equal to JCV (outer) is selected, which means the first row in B.C1 is selected, and the value of 1 is read. The two join column values are the same (step 430=YES), so the join row is added to the join result (step 440), resulting in the third entry of the NLJ Results table 530 that has values 1, F, 1. There are no more rows in the inner table that have the same value of 1 (step 450=NO), and there are more rows in the outer table (step 460=NO), so method 400 loops back to step 410 and selects the next (fourth) row in the outer table, and reads its join column value of 2. The next join column value in the inner table that has a value equal to or greater than the value of 2 is selected (step 420), which is the second row in B.C1, which has a value of 5. The values of 2 and 5 are not equal (step 430=NO), and there are more rows in the outer table (step 460=YES), so method 400 loops back to step 410 and continues. One skilled in the art will realize that method 400 continues for each row in the outer table. The final results of performing method 400 on Table A and Table B are shown as the NLJ1 Results table 530.

Now that the results of the inner join NLJ1 510 have been generated, the results 530 of NLJ1 510 and Table C are then joined as shown at NLJ2 520 using method 400. The result is shown at NLJ2 Results 540. We see that due to the data skew between the three tables, only two of the 22 rows in Table A are in the final result. This means the processing of the other 20 rows in Table A did not contribute to the final results. The time processing the 20 rows that did not contribute to the final results causes the performance of the query to suffer.

Figure 6:
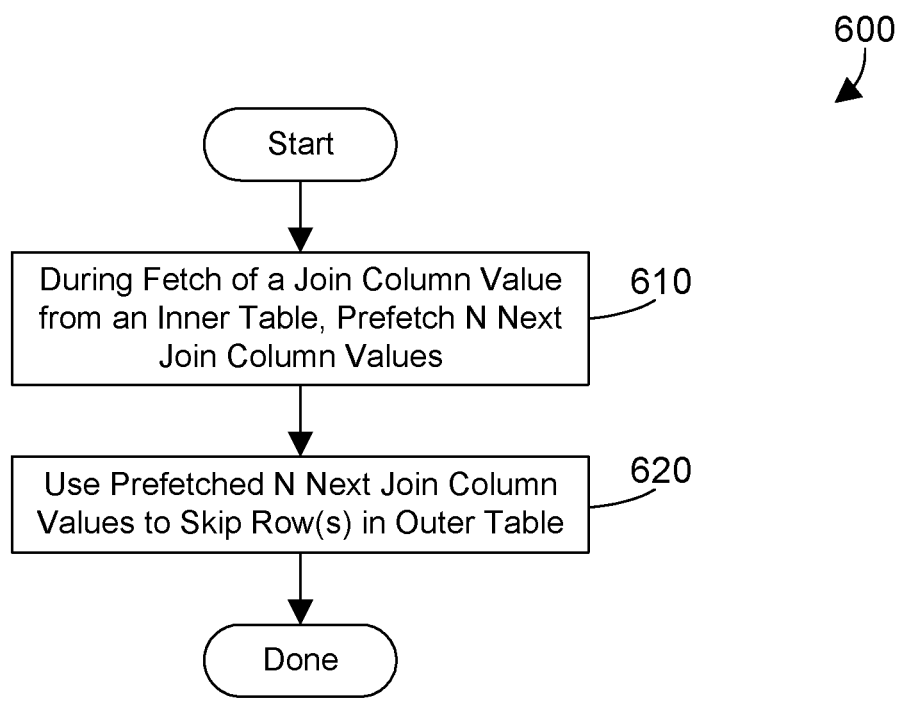
FIG. 6 is a flow diagram of a method in accordance with the preferred embodiments for using prefetched values from an inner table to skip rows in an outer table during the processing of a table join in a database query.

Referring to FIG. 6, a method 600 in accordance with the preferred embodiments uses prefetched values of inner tables to skip rows in the outer table during the execution of a table join. During a fetch of a join column value from an inner table, prefetch N next join column values (step 610). Use the prefetched N next join column values for the inner table to skip one or more rows in the outer table (step 620). Method 600 is then done. In contrast to the prior art method in FIG. 4, which is performed a first time for the NLJ1 510 in FIG. 5 and a second time for NLJ2 520 in FIG. 5, method 600 can evaluate prefetched values of one or more inner tables to skip rows in the outer table, which greatly reduces the number of outer rows processed by the join and reduces the number of intermediate results when compared to prior art method 400 in FIG. 4.

Figure 7:
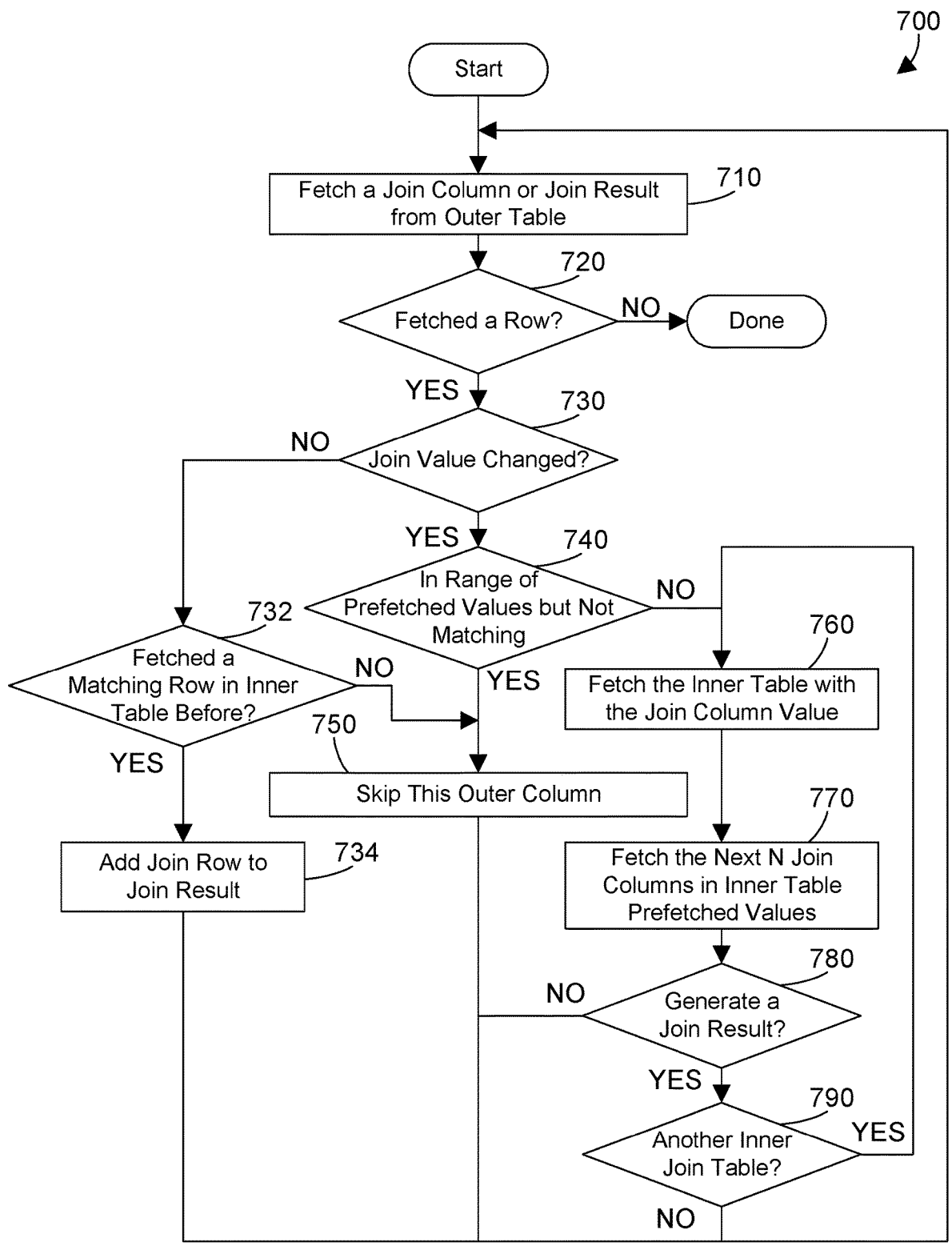
FIG. 7 is a flow diagram of a method in accordance with the preferred embodiments for performing a join of two or more database tables and for using prefetched values from one or more inner tables to skip rows in an outer table.

FIG. 7 shows a method 700 that is one suitable specific implementation for the method 600 shown in FIG. 6. A join column or join result is fetched from the outer table (step 710). If step 710 did not fetch a row (step 720=NO), method 700 is done. If step 710 fetched a row (step 720=YES), if the join value did not change (step 730=NO), step 732 determines whether a matching row in the inner table was fetched before. When a matching row in the inner table was fetched before (step 732=YES), add the join row to the join result (step 734). When a matching row in the inner table was not fetched before (step 732=NO), skip this outer column (step 750). Method 700 then loops back to step 710 and continues. When the join value changed (step 730=YES), and the join value is in the range of prefetched values but not matching (step 740=YES), skip this outer column (step 750), then loop back to step 710 and continue. When the join value changed (step 730=YES) and does not match and is not in the range of prefetched join column values (step 740=NO), fetch the inner table with the join column value (step 760). Fetch the next N join columns in the inner table prefetched values (step 770). When a join result is not generated (step 780=NO), loop back to step 710 and continue. When a join result is generated (step 780=YES), and there is not another inner join table (step 790=NO), loop back to step 710 and continue. When a join result is generated (step 780=YES) and there is another inner join table (step 790=YES), loop back to step 760 and repeat steps 760 through 790 for the next inner table.

Figure 8:
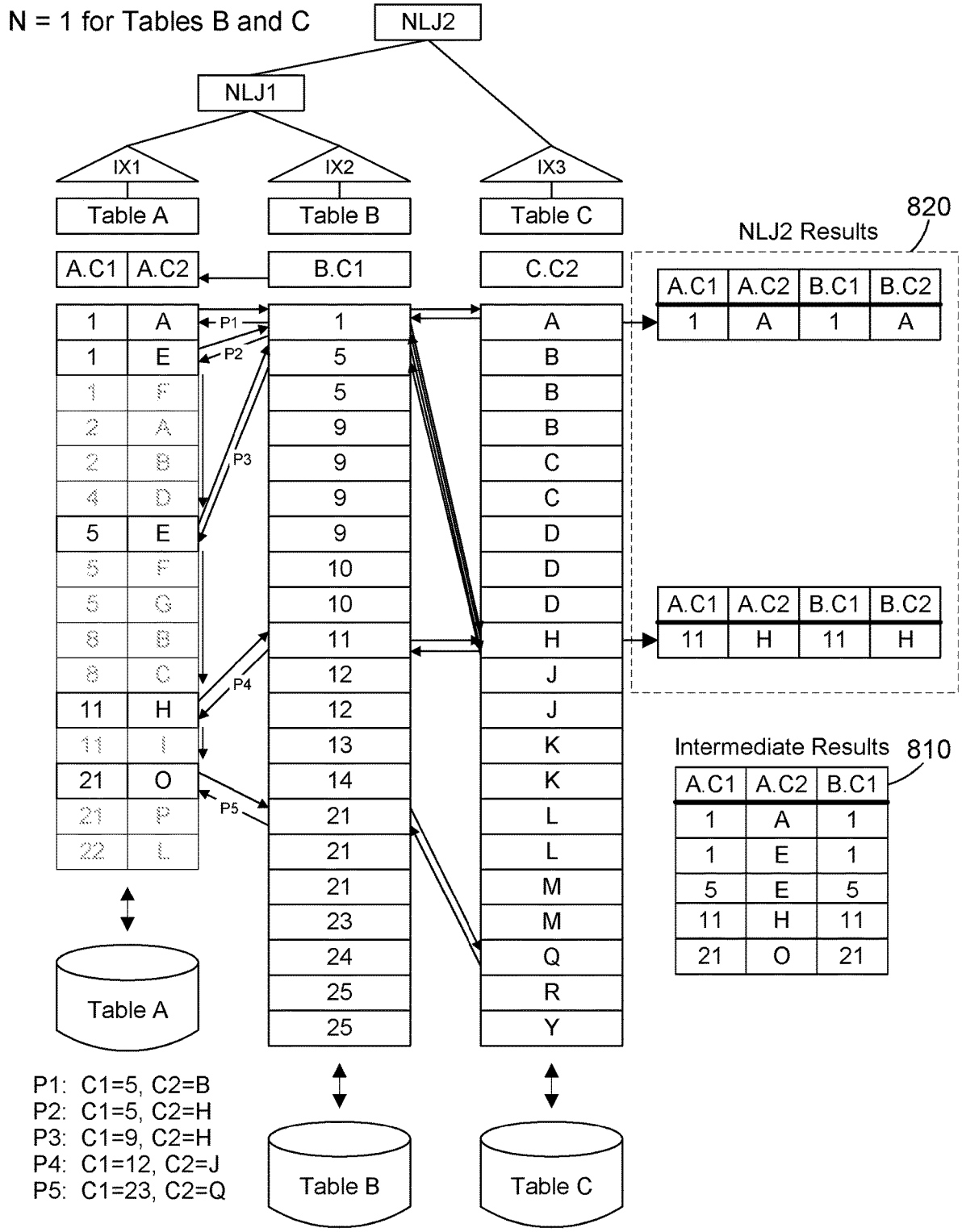
FIG. 8 is a block diagram illustrating one suitable example of joining three database tables in the sample query in FIG. 3 using the method in FIG. 7 when the prefetch value N is 1 for Table B and is 1 for Table C.

The method 700 can be applied to the same tables in FIG. 5 for the query in FIG. 3, as shown in FIG. 8. Note the prefetch value N for both Tables B and C is 1, which means only one value is prefetched from Table B and from Table C at a time. The first row of Table A is selected. When the first join column value of 1 in table B.C1 is fetched, a prefetch P1 is also made for the next value in Table B and Table C. Prefetch P1 prefetches C1=5 and C2=B, as shown in the lower left of FIG. 8. The first row is added to the intermediate results table 810. The next row in Table A has the same value for A.C1 as the first row. When the first join column value of 1 in table B.C1 is fetched, a prefetch P2 is also made for the next value in Table B and Table C. Prefetch P2 prefetches C1=5 and C2=H. The second row is added to the intermediate results table 810. The third row in Table A with the values 1,F can be skipped because the value C2=F is less than C2=H prefetched in P2. The fourth, fifth and sixth rows in Table A can be skipped because the join column value A.C1 is not equal to the fetched value of B.C1 and is less than the prefetched value C1=5 in P2. The next row in the outer table is the seventh row with the values 5,E. The value of A.C1 matches the prefetched value of C1=5, so when the first matching join column value in B.C1 in the second row is fetched, a prefetch P3 is also made for the next value in Table B and Table C. Prefetch P3 prefetches C1=9, C2=H. The row is added to the intermediate results table 810. The next four rows in Table A are skipped because the values of A.C2 are less than the prefetched value of H in C.C2. The next row in the outer table is the twelfth row, with the values 11,H. When the matching value of 11 is fetched from B.C1, a prefetch P4 is also made for the next value in Table B and Table C. Prefetch P4 prefetches C1=12, C2=J. The row is added to the intermediate results table 810. The next row in the outer table can be skipped because the value of I in A.C2 is less than the prefetched value of J in P4. The next row in the outer table has a value of 21,O. When this value is fetched from B.C1, a prefetch P5 is also made for the next value in Table B and Table C. Prefetch P5 prefetches C1=23 and C2=Q. The row is added to the intermediate results 810.

The last two rows in the outer Table A can be skipped because the values of A.C2 are less than the value of Q that was prefetched in P5.

FIG. 8 graphically illustrates that eleven of the sixteen rows in the outer table, Table A, are skipped based on the prefetched values. The set of intermediate results 810 for the embodiment that uses prefetching has five rows, while the NLJ1 of the prior art results in table 530 in FIG. 5 that has seventeen rows. The intermediate results can then be processed to produce the NLJ2 results 820. Skipping eleven of the sixteen rows of the outer table, and generating less than a third of the intermediate results, results in a query that can be executed in substantially less time, thereby improving the performance of the query using the prefetching disclosed and claimed herein.

Figure 9:
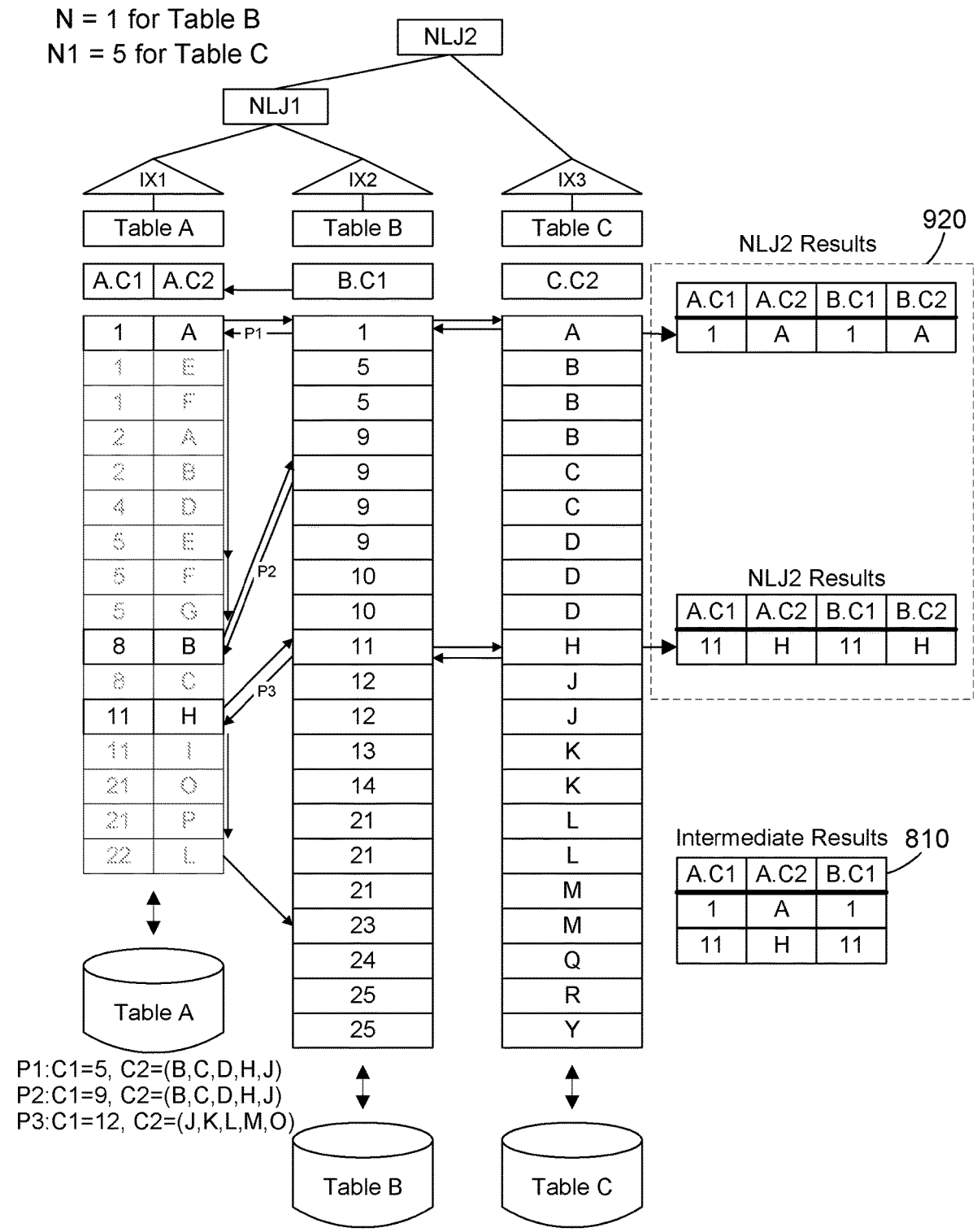
FIG. 9 is a block diagram illustrating one suitable example of joining three database tables in the sample query in FIG. 3 using the method in FIG. 7 when the prefetch value N is 1 for Table B and the prefetch value N1 is 5 for Table C.

In another example shown in FIG. 9, the prefetch value N for Table B is set to 1 while the prefetch value N1 for Table C is set to 5. Increasing the prefetch value N1 to 5 for Table C allows skipping even more of the rows in Table A, and generating only two intermediate results 810, which are the same rows as in the final NLJ2 results 920.

Figures 10, 11:
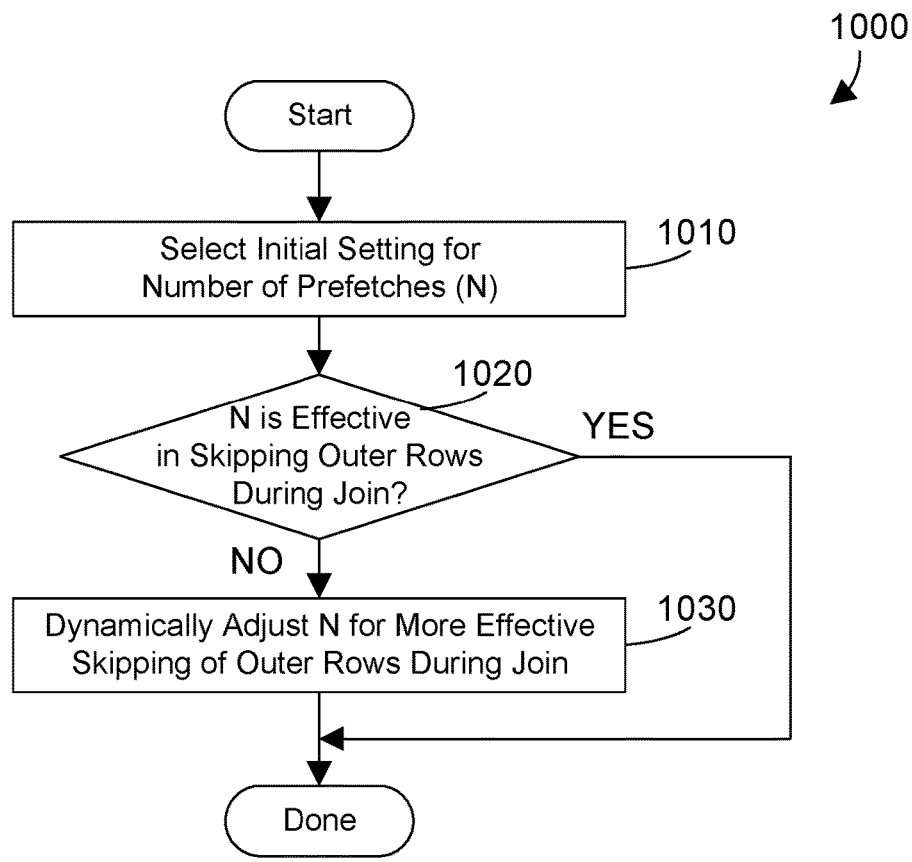
FIG. 10 is a flow diagram of a method for setting and dynamically adjusting the number of prefetches N.
FIG. 11 is a formula that shows one suitable way to determine an initial setting for the number of prefetches N.

The number N of prefetches for each inner table can be set in any suitable way. For example, a default of N=1 could be used for all inner tables, and a user could then have the ability to change the value of N to a user-specified value. In addition, the number N of prefetches can be dynamically adjusted to be more effective in skipping outer rows during the join. This could be done, for example, by the dynamic prefetch number adjusted 230 in FIG. 2. Referring to FIG. 10, a method 1000 selects an initial setting for N (step 1010). The initial setting for N could be set based on attributes of join columns in the first and second tables. When N is effective in skipping outer rows during the join (step 1030=YES), N remains the same, and method 1000 is done. When N is not effective in skipping outer rows during the join (step 1020=NO), dynamically adjust N for more effective skipping of outer rows during the join (step 1030). This dynamic adjustment of N in step 1030 allows for increasing performance of a join query as the join query executes. In the alternative, the value of N for one execution of a query could be adjusted after the query execution completes so future executions of the query use a different value of N.

FIG. 11 shows a suitable formula for an initial setting for the prefetch value N. The formula in FIG. 11 is an example of setting the initial value of N based on attributes of join columns in the first and second tables.

Figure 12:
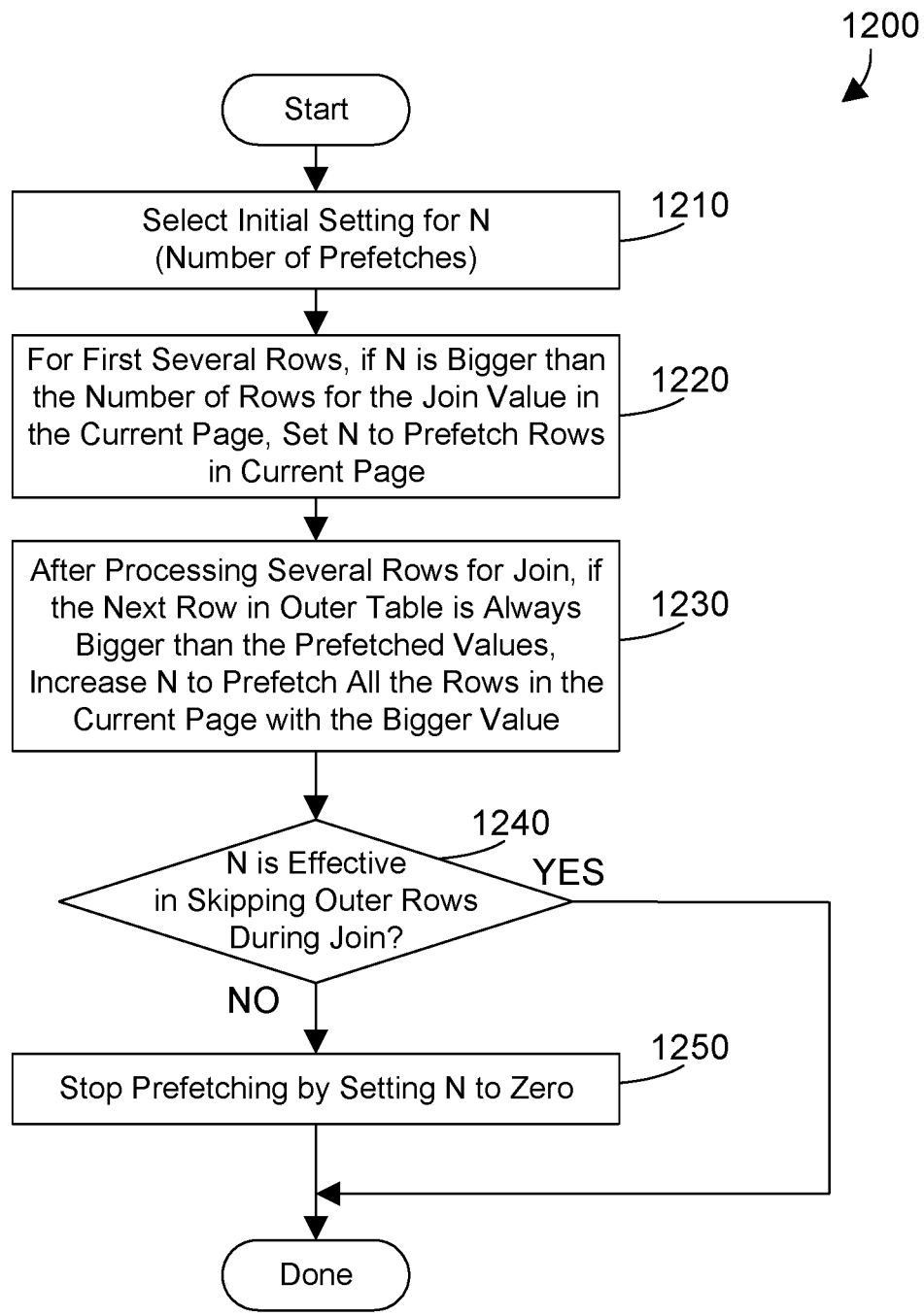
FIG. 12 is a flow diagram showing a more detailed method for setting and dynamically adjusting the number of prefetches N.

Referring to FIG. 12, a method 1200 is one specific implementation of method 1000 in FIG. 10. An initial setting for N is selected (step 1210). For the first several rows, if N is bigger than the number of rows for the join value in the current page, set N to prefetch rows in the current page (step 1220). After processing several rows for the join, if the next row in the outer table is always bigger than the prefetched values, increase N to prefetch all of the rows in the current page with the bigger value (step 1230). When N is effective in skipping the outer rows during the join (step 1240=YES), no further adjustment to N is made, and method 1200 is done. When N is not effective in skipping the outer rows during the join (step 1240=NO), prefetching is stopped by setting N to zero (step 1250), and method 1200 is done.

A database query processor includes a database join prefetcher that prefetches N next join column values in order to execute the query more efficiently. The prefetched next join column values for an inner table are used to skip rows in an outer table, thereby increasing the performance of executing the query. The number N of prefetches can be dynamically determined and adjusted to improve the performance of executing the query.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. An apparatus comprising:
   at least one processor;
   a memory coupled to the at least one processor;
   a database residing in the memory, the database comprising a first table and a second table;
   a database query residing in the memory that comprises a join of the first table and the second table, wherein the first table is an outer table of the join and the second table is an inner table of the join; and
   a database query processor including a database join prefetcher, executable by the at least one processor, that, during a fetch of a join column value from the second table, prefetches a predetermined number N of next join column values from the second table, wherein N is an integer greater than zero, and wherein the database query processor uses the prefetched N next join column values from the second table to skip at least one row in the first table during processing of the database query.

2. The apparatus of claim 1, wherein the predetermined number Nis set to an initial value based on attributes of join columns in the first and second tables.

3. The apparatus of claim 2, wherein the initial value for the predetermined number Nis determined based, at least in part, on the attributes of join columns in the first table and the second table.

4. The apparatus of claim 2, wherein the database join prefetcher dynamically adjusts the predetermined number N as the database query processor executes the database query for more effective skipping of outer rows using the prefetched N next join column values.

5. The apparatus of claim 1, wherein the database further comprises a third table and the database query comprises a join of the first table, the second table, and the third table, wherein the third table comprises a second inner table, wherein the database join prefetcher prefetches the predetermined number N of next join column values from the second table and prefetches a predetermined number N1 of next join column values from the third table, wherein N1 is an integer greater than zero.

6. The apparatus of claim 5, wherein the database join prefetcher dynamically adjusts the predetermined numbers N and N1 as the database query processor executes the database query for more effective skipping of outer rows using the prefetched next join column values from the second and third tables.

7. An article of manufacture comprising software stored on a computer readable storage medium, the software comprising:
   a database query processor that executes a database query that comprises a join of a first table in a database and a second table in the database, wherein the first table is an outer table of the join and the second table is an inner table of the join, wherein the database query processor includes a database join prefetcher that, during a fetch of a join column value from the second table, prefetches a predetermined number N of next join column values from the second table, wherein N is an integer greater than zero, and wherein the database query processor uses the prefetched N next join column values from the second table to skip at least one row in the first table during processing of the database query.

8. The article of manufacture of claim 7, wherein the predetermined number N is set to an initial value based on attributes of join columns in the first and second tables.

9. The article of manufacture of claim 8, wherein the initial value for the predetermined number N is determined based, at least in part, on the attributes of join columns in the first table and the second table.

10. The article of manufacture of claim 8, wherein the database join prefetcher dynamically adjusts the predetermined number N as the database query processor executes the database query for more effective skipping of outer rows using the prefetched N next join column values.

11. The article of manufacture of claim 7, wherein the database further comprises a third table and the database query comprises a join of the first table, the second table, and the third table, wherein the third table comprises a second inner table, wherein the database join prefetcher prefetches the predetermined number N of next join column values from the second table and prefetches a predetermined number N1 of next join column values from the third table, wherein N1 is an integer greater than zero.

12. The article of manufacture of claim 11, wherein the database join prefetcher dynamically adjusts the predetermined numbers N and N1 as the database query processor executes the database query for more effective skipping of outer rows using the prefetched next join column values from the second and third tables.

13. A method for processing a database query, wherein the database query comprises a join of a first table and a second table in a database, and wherein the first table is an outer table of the join and the second table is an inner table of the join, the method comprising:

during a fetch of a join column value from the second table, prefetching a predetermined number N of next join column values from the second table, wherein N is an integer greater than zero; and using the prefetched N next join column values from the second table to skip at least one row in the first table during processing of the database query.

14. The method of claim 13, further comprising initially setting the predetermined number N based on attributes of join columns in the first and second tables.

15. The method of claim 14, wherein the initial value for the predetermined number N is determined based, at least in part, on the attributes of join columns in the first table and the second table.

16. The method of claim 14, further comprising dynamically adjusting the predetermined number N as the database query processor executes the database query for more effective skipping of outer rows using the prefetched N next join column values.

17. The method of claim 13, wherein the database further comprises a third table and the database query comprises a join of the first table, the second table, and the third table, wherein the third table comprises a second inner table, wherein the method further comprises prefetching the predetermined number N of next join column values from the second table and prefetching a predetermined number N1 of next join column values from the third table, wherein N1 is integer greater than zero.

18. The method of claim 17, further comprising dynamically adjusting the predetermined numbers N and N1 as the database query processor executes the database query for more effective skipping of outer rows using the prefetched next join column values from the second and third tables.

* * * * *